US009606572B2

(12) United States Patent
    Sood (10) Patent No.: US 9,606,572 B2
(45) Date of Patent: Mar. 28, 2017

(54) CIRCUITS FOR AND METHODS OF PROCESSING DATA IN AN INTEGRATED CIRCUIT DEVICE

(71) Applicant: Xilinx, Inc., San Jose, CA (US)

(72) Inventor: Santosh Kumar Sood, New Delhi (IN)

(73) Assignee: XILINX, INC., San Jose, CA (US)

( * ) Notice: Subject to any disclaimer, the term of this patent is extended or adjusted under 35 U.S.C. 154(b) by 227 days.

(21) Appl. No.: 14/503,845

(22) Filed: Oct. 1, 2014

(65) Prior Publication Data
    US 2016/0098059 A1    Apr. 7, 2016

(51) Int. Cl.
    *G06F 1/08*    (2006.01)

(52) U.S. Cl.
    CPC ..................... *G06F 1/08* (2013.01)

(58) Field of Classification Search
    CPC .......................................... G06F 1/08
    See application file for complete search history.

(56) References Cited

U.S. PATENT DOCUMENTS

| | | | | |
|---|---|---|---|---|
| 3,820,030 A * | 6/1974 | Williams | ................ | H04L 7/033 327/160 |
| 5,053,986 A * | 10/1991 | Ahsan | ..................... | G06F 7/026 708/508 |
| 6,247,036 B1 * | 6/2001 | Landers | .................... | G06F 7/49 708/603 |
| 8,866,522 B1 * | 10/2014 | Kim | ...................... | H03L 7/0814 327/148 |
| 2013/0179742 A1 * | 7/2013 | Tekumalla | ..... | G01R 31/318541 714/726 |
| 2014/0159771 A1 * | 6/2014 | Ikeda | ................ | H03K 19/0016 326/41 |

OTHER PUBLICATIONS

Eide, Geir, "Designs with multiple clock domains: New tools avoid clock skew and reduce pattern counts," *EE Times*, Jan. 23, 2002, pp. 1-22, EE Times, www.eetimes.com.

* cited by examiner

*Primary Examiner* — Thomas Lee
*Assistant Examiner* — Chad Erdman
(74) *Attorney, Agent, or Firm* — John J. King (57) ABSTRACT

A circuit for processing data in an integrated circuit device comprises a selection circuit; a first register coupled to a first output of the selection circuit; a second register implemented as a latch and coupled to a second output of the selection circuit; and a signal line coupled between the output of the first register and an input of the selection circuit. The selection circuit enables the coupling of an output signal of the first register to an input of the second register. A method of processing data in an integrated circuit device is also disclosed.

14 Claims, 8 Drawing Sheets

CIRCUITS FOR AND METHODS OF PROCESSING DATA IN AN INTEGRATED CIRCUIT DEVICE

TECHNICAL FIELD

The present invention relates generally to integrated circuit devices, and in particular, to circuits and methods for processing data in an integrated circuit device.

BACKGROUND

Data transmission is an important part of many integrated circuit devices and systems having integrated circuit devices. Data is typically communicated with an integrated circuit device by way of an input/output port. Data may be communicated in a system in different formats and according to a variety of data communication protocols. However, skew associated with a clock signal or a data signal can significantly affect the transmission of data.

When latching data within a circuit, it is necessary to ensure that the hold time for the circuit is sufficient to capture the correct data. Ensuring adequate hold times in some integrated circuits, such as programmable logic devices (PLDs), may be a challenge. That is, non-ideal clock tree arrangements across different clock regions result in significant skew, requiring a delay of a signal to be varied depending on locations of registers in customer designs.

Conventional solutions to address the delay of a signal include adding buffers, which could be implemented in lookup tables (LUTs), for example. However, the additional LUT increase power and routing cost, where the routing cost is even more prohibitive in highly congested designs. Another solution includes the implementation of optional delay elements. However, the optional delay elements add additional silicon and static power cost, even if the delays are not used.

Accordingly, providing more efficient circuits for processing data in an integrated circuit is beneficial.

SUMMARY

A circuit for processing data in an integrated circuit device is described. The circuit comprises a selection circuit; a first register coupled to a first output of the selection circuit; a second register implemented as a latch and coupled to a second output of the selection circuit; and a signal line coupled between the output of the first register and an input of the selection circuit. The selection circuit enables the coupling of an output signal of the first register to an input of the second register.

Another circuit for processing data in an integrated circuit device comprises a plurality of configurable logic elements. Each configurable logic element comprises: a look-up table; a selection circuit coupled to an output of the look-up table; a first register coupled to a first output of the selection circuit; and a second register implemented as a latch and coupled to a second output of the selection circuit. The selection circuit enables the coupling of an output of the first register to an input of the second register. The circuit also comprises programmable interconnect elements that are configurable to couple an output of a first configurable logic element of the plurality of configurable logic elements to an input of a second configurable logic element of the plurality of configurable logic elements.

A method of processing data in an integrated circuit device is also described. The method comprises providing a selection circuit having a plurality of inputs and at least one output; routing an output of a first register to an input of the selection circuit; implementing a second register as a latch; and coupling the at least one output of the selection circuit to an input of the second register.

Other features will be recognized from consideration of the Detailed Description and Claims, which follow.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The circuits and methods set forth below provide an improved circuit for processing data, and may be implemented as repeatable circuit blocks of an integrated circuit that are selectively connected by programmable interconnect elements. The circuits may also be programmable to enable different operations, such as a conventional operation for registering data as latch or flop, or an operation as a lock-up latch to relieve a hold constraint between two registers of an integrated circuit. More particularly, the circuit may be implemented as an enhancement in a configurable logic element (CLE) of an integrated circuit to enable low cost lock-up latch implementation. While the circuits and methods may be implemented in any type of integrated circuit, the use of the enhanced configurable logic elements may find particular application in programmable logic devices (PLDs), such as field programmable gate arrays (FPGAs), as will be described in more detail below.

According to the various implementations described below, a low power solution having no additional routing cost for relieving the hold constraint from a first register to a second register is provided. That is, the hold constraint is relieved by latching the output of the first register, such as on negative level triggered latch. Such an arrangement enables a minimum delay constraint for hold from the first register to the latch because it is on same clock edge as the clock coupled to the first register. The negative edge triggered latch may be implemented using an inverter, where the clock signal may be coupled to the latch, or an inverted clock signal generated by the inverter may be selectively coupled to a clock input of the latch.

A circuit for processing data in an integrated circuit device may be implemented in a circuit having configurable resources, such as a configurable logic element, that may be implemented in a pattern and connected by programmable interconnect elements. The circuit may comprise a selection circuit; a first register coupled to a first output of the selection circuit; a second register implemented as a latch and coupled to a second output of the selection circuit, and a signal line coupled between the output of the first register and an input of the selection circuit; wherein the selection circuit enables the coupling of an output signal of the first register to an input of the second register. The selection circuit may be used to enable the coupling of an output of the second register to an input of the first register. The circuit may further comprise a first inverter coupled to receive a clock signal, wherein the clock signal is coupled to an input of the first register and an output of the first inverter is coupled to a clock input of the second register.

Figure 1:
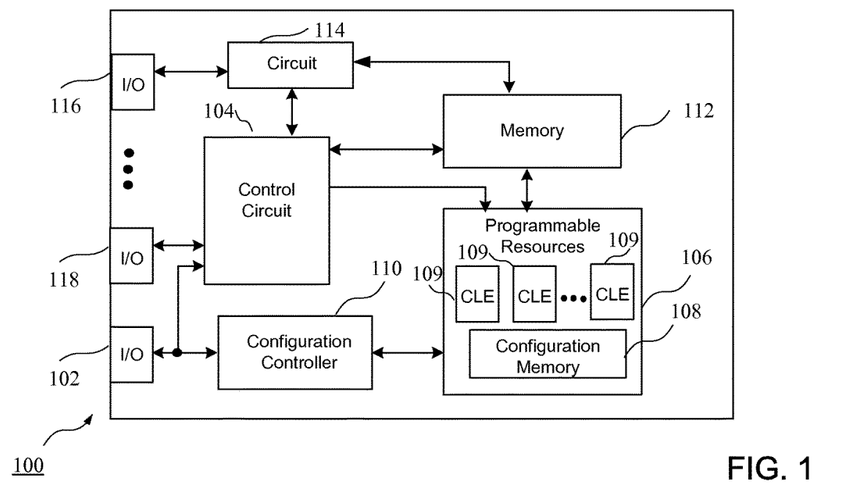
FIG. 1 is a block diagram of an integrated circuit having programmable resources.

Turning first to FIG. 1, a block diagram of an integrated circuit device 100 having programmable resources. In particular, an input/output (I/O) port 102 is coupled to a control circuit 104 that controls programmable resources 106 having configuration memory 108. Configuration data, which will be described in more detail below in reference to FIGS. 7-10, may be provided to the configuration memory 108 by a configuration controller 110. The programmable resources also comprise configurable logic elements (CLEs) 109. A separate memory 112, which may be a non-volatile memory for example, may be coupled to the control circuit 104 and the programmable resources 106. Another circuit 114 may be coupled to the control circuit 104 and the memory 112, and may communication signals external to the integrated circuit device by way of an I/O port 116. Other I/O ports may be coupled to circuits of the integrated circuit device, such as I/O port 118 that is coupled to the control circuit 104 as shown. A circuit arrangement implemented as a lockup latch may be implemented in the programmable resources 106, such as in one or more CLEs 109. That is, a register and a latch necessary to implement a lock-up latch may be implemented in a single CLE to provide improved timing when routing data from the CLE to another CLE, as will be described in more detail below.

Figure 2:
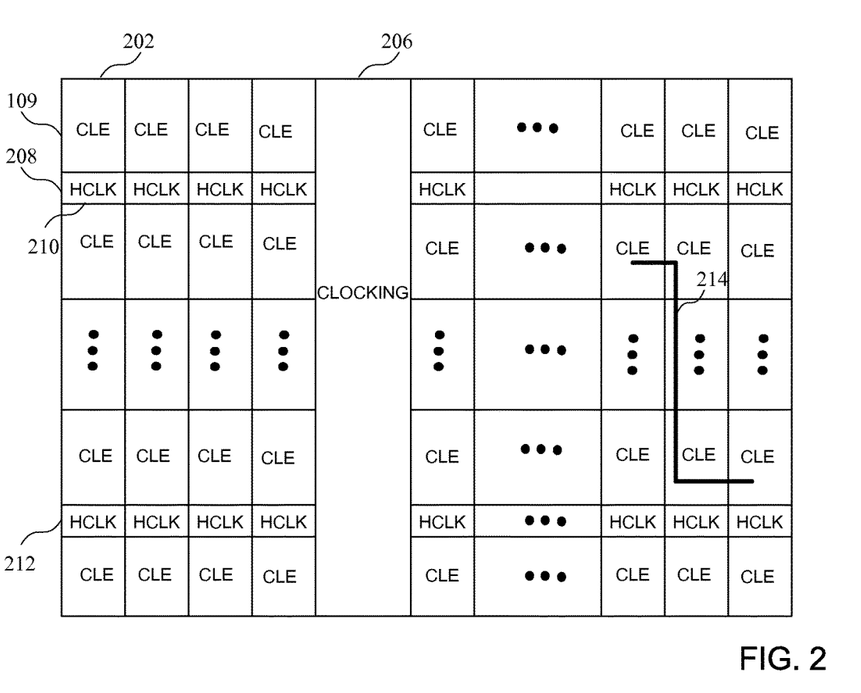
FIG. 2 is a block diagram showing a portion of the programmable resources of FIG. 1.

Turning now to FIG. 2, a block diagram shows a portion of the programmable resources 106 of FIG. 1, and more particularly a plurality of CLEs that may be selectively coupled using programmable interconnect elements. The programmable resources of FIG. 2 comprises CLEs 109, which may be arranged in columns 202 as shown. Examples of CLEs will be shown and described in more detail in reference to FIGS. 5 and 8. Clocking elements enabling the routing of clocking signal to the various CLEs are also provided. For example, the clocking elements may comprise a clock tree having a clock column 206 and a horizontal clock row 208 having a plurality of horizontal clock (HCLK) routing blocks 210. A second horizontal clock row 212 is also shown. The clocking elements enable the latching of data by registers of the CLEs. A data path 214 for routing a clock signal between two CLEs is shown. As will be described in more detail below, a circuit is routed with various paths, such as path 214, to meet appropriate timing requirements. The circuit may be re-routed if timing requirements are not met, or to provide an optimal path between certain CLEs.

Figure 3:
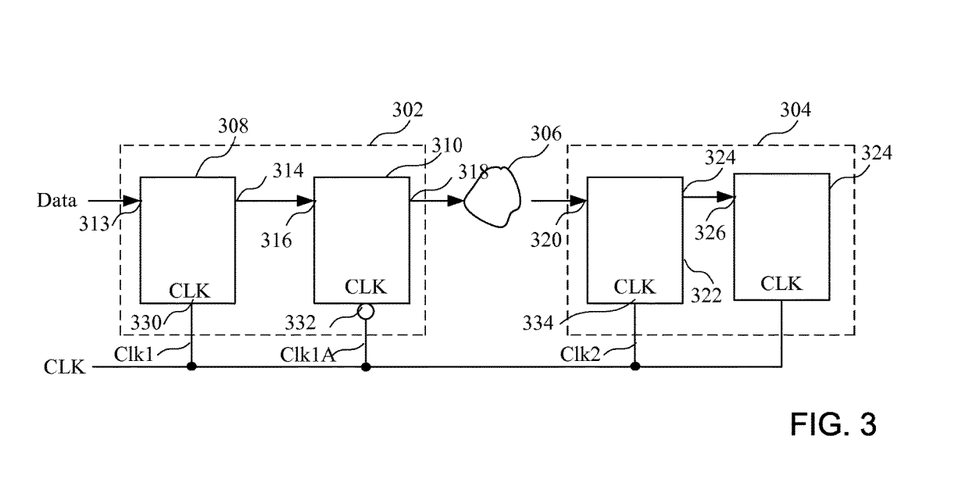
FIG. 3 is a circuit diagram showing the connection of two configurable logic elements of the programmable resources of FIG. 2.

Turning now to FIG. 3, a circuit diagram shows the connection of two configurable logic elements of the programmable resources such as CLEs 109 of programmable resources 106. In particular, a first CLE 302 is coupled to a second CLE 304 by way of a data path 306. The data path 306, which could correspond to the data path 214 of FIG. 2 for example, is selected to meet certain timing requirements, for example. The CLE 302 comprises a first register 308 coupled to a second register 310, where the second register may be configured as a latch. CLE 302 may be implemented with register 310 functioning as a latch, or alternatively, the CLE 302 may be a configurable circuit that can be selectively configured such that register 310 functions as a latch, as will be described in more detail in reference to FIGS. 5 and 8.

Data is coupled to an input 313 of the register 308, and an output 314 is coupled to an input 316 of the register 310. An output 318 of the register is coupled to the path 306, which may be implemented in programmable interconnect elements, as will be described in more detail in reference to FIGS. 7-10.

CLE 304 also comprises a pair of registers 322 and 324 that are coupled together, where the data path 306 is coupled to an input 320 of a register 322. An output 325 of the register 322 is coupled to an input 326 of the register 324. Register 324 may also be selectively configured to function as a latch as will be described in reference to FIGS. 5 and 8. Clock signals are also coupled to clock inputs of the registers. A clock signal (CLK) is provided to various clock inputs, where the clock signal is designated as Clk1, Clk1A, and Clk2 at the clock inputs 330, 332 and 334, respectively. It should be understood that, while these clock signals will generally have different timing as they are routed along different paths to their respective clock inputs, Clk1 and Clk1A will be close because they are routed to clock inputs within the same CLE. However, Clk2 at the clock input of the register 322 may be at distance from the clock inputs of the registers 308 and 310, and therefore have different timing.

Figure 4:
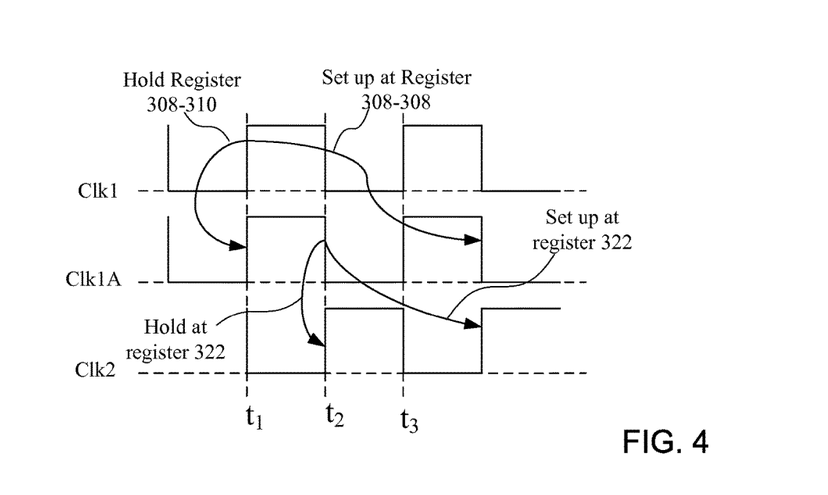
FIG. 4 is a timing diagram associated with the operation of the circuit of FIG. 3.

The registers 308 and 310 are implemented as a lockup latch by implementing the register 308 as a negative level triggered latch, wherein an inverted Clk1A signal is applied to the clock input of the register 310. The set-up and holds for the circuit arrangement of FIG. 3 is shown in FIG. 4. Implementing register 310 as a negative level trigged latch and inverting the clock signal coupled to the clock input relieves the minimum delay constraint for hold from the register 308 to the register 310 (i.e., latch) because they are triggered on the same clock edge.

While the lockup latch functionality only requires registers 308, 310 and 322, where register 310 is configured as a latch, all of the CLEs 109 of the programmable resources 106 are preferably able to be selectively configured such that a one of the register of a pair of registers coupled in series can be configured to function as a latch. That is, implementing the lockup latch functionality in each of the CLEs provides greater flexibility in placing and routing circuits in an integrated circuit. Further, minimal additional circuitry is required to enable the implementation of a lockup latch in an integrated circuit when the latch of the register-latch pair of a lock-up latch are in the same CLE, as will be described in more detail below in reference to FIGS. 5 and 8.

Figure 5:
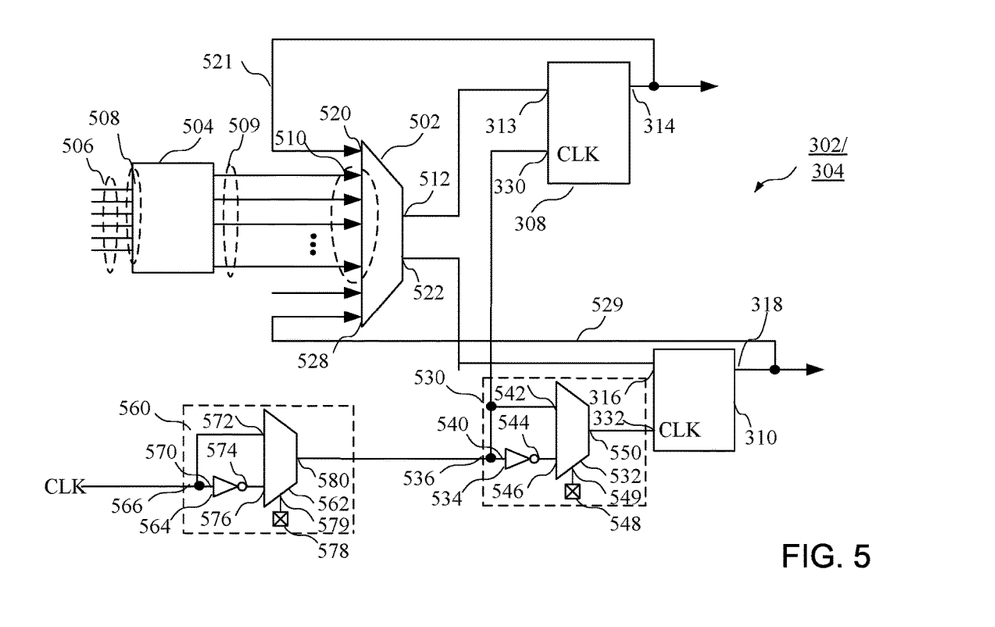
FIG. 5 is a circuit diagram of a configurable logic element, such as CLEs 302 and 304 of FIG. 3.

Turning now to FIG. 5, a circuit diagram of a configurable logic element, such as CLE 302 or 304 of FIG. 3 is shown. As set forth above, each of the CLEs of an integrated device can be implemented as shown in FIG. 5 to provide the functionality of the CLE of FIG. 5 at any CLE location. The CLE of FIG. 5 comprises a multiplexer 502 that is coupled to a lookup table 504. The lookup table 504 is coupled to a plurality of data lines 506 at a corresponding plurality of inputs 508. Outputs 509 of the lookup table 504 are coupled to corresponding inputs 510 of the multiplexer 502. Additional details regarding the lookup table 504 will be described in FIG. 8, while additional details of the multiplexer 502 will be described in reference to FIG. 6.

A first output 512 of the multiplexer 502 is coupled to an input 313 of the register 308, where an output 314 is coupled to an input 520 of the multiplexer 502 by way of a signal line 521. While the signal line 521 may be implemented in programmable resources of an integrated circuit implementing the CLE of FIG. 5, the signal line is preferably implemented as a designated signal line associated with the CLE to minimize any delay in providing an output of the register 308 to an input of the register 310. Similarly, an output 522 of the multiplexer 502 is coupled to the input 316 of the register 310. The output 318 of the register 310 is coupled to another input 528 of the multiplexer 502 by way of a signal line 529. The signal line 529 is also preferably a dedicated signal line associated with the CLE.

As described above in reference to FIG. 3, the circuit of FIG. 5 enables the selection and routing of an inverted clock signal, relative to the clock signal provided to the register 308, to the register 310. The circuit arrangement of FIG. 5 is configurable to enable the coupling of either the clock signal that is provided to the register 308, or an inverted clock signal relative to the clock signal provided to the register 308. More particularly, a clock control circuit 530 comprises a multiplexer 532 and an inverter 534. A clock signal coupled to an input 536 of the clock control circuit 530 is coupled to an input 540 of the inverter 534. The clock signal is also coupled to a first input 542 of the multiplexer 532, while an output 544 of the inverter 534 is coupled to a second input 546 of the multiplexer 532. A programmable memory element 548, which may be a configuration bit stored in configuration memory such as configuration memory 108 for example, is coupled to a control terminal 549 to control the operation of the multiplexer 532. An output 550 of the multiplexer 532 is coupled to the clock input 332 of the register 310. Accordingly, the memory element 548 can be configured, during an initial configuration or a partial reconfiguration as will be described in more detail below, to select the desired clock signal coupled to the clock input 332 of the register 310. As set forth above, an inverted clock signal can be selected and the register 310 or 308 can be configured to function as a latch when the CLE of FIG. 5 is intended to be implemented as a lockup latch. Another benefit of the inverter 540 is that it helps in a latch-based design implementation, as it is possible to have out-of-phase clocks for two latches in the same row. Thus, time-borrowing functions can be implemented by sharing inputs and using outputs latched in same row.

A second clock control circuit 560 comprises a multiplexer 562 and an inverter 564. An input clock signal (CLK) coupled to an input 566 of the clock control circuit 560 is coupled to an input 570 of the inverter 564. The clock signal is also coupled to a first input 572 of the multiplexer 562, while an output 574 of the inverter 564 is coupled to a second input 576 of the multiplexer 562. A programmable memory element 578 is coupled to a control terminal 579 to control the operation of the multiplexer 562. An output 580 of the multiplexer 632 is coupled to the input 540 of the inverter 534. The second clock control circuit 560 enables the overall selection of the clock phase for the CLE.

Figure 6:
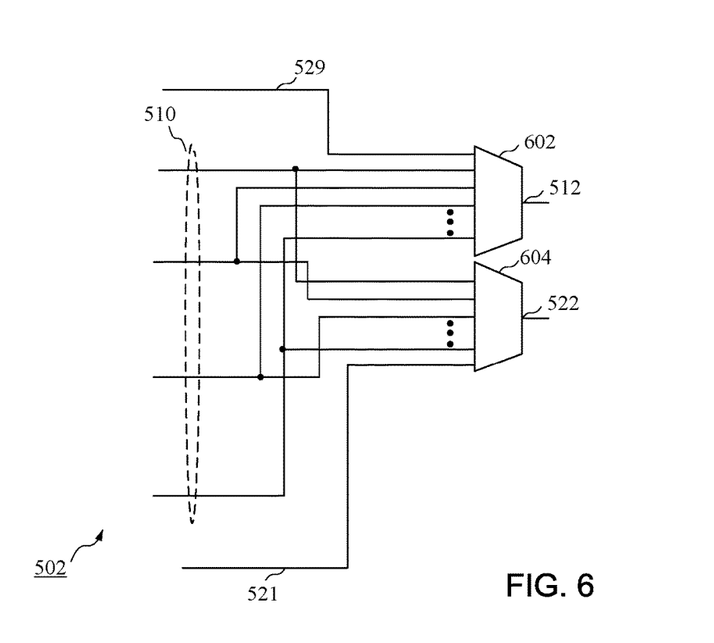
FIG. 6 is a block diagram of the multiplexer 502 of FIG. 5.

Turning now to FIG. 6, a block diagram of the multiplexer 502 of FIG. 5 is shown. More particularly, a first multiplexer 602 and a second multiplexer 604 are coupled to receive various inputs, where the multiplexer 602 is coupled to receive the signal line 529 and the multiplexer 604 is coupled to receive the signal line 521. By generating the two outputs of the multiplexer 502, various inputs, including outputs of the registers 308 and 310, can be routed to the inputs of the registers 308 and 310.

By implementing a latch required for a lockup latch circuit in the same configurable block as the register that drives the latch, there is no additional latency, leading to improved performance compared to a circuit using a register of a separate CLE as a latch for an output of a register of a CLE. Further, by enabling the selection of either a clock signal or an inverted clock signal that is routed to one of the registers, a conventional operation of a configurable block, such as a CLE, or an enhanced operation of the CLE to enable the configurable block to function as a lockup latch could be selected. As will be described in more detail in reference to FIG. 8, a CLE may be implemented with two registers per lookup table (LUT), where both registers share the same clock and one of the registers can also be configured as a latch to enable the functionality of a lockup latch. To enable an efficient lock-up latch (i.e., lower power and minimal routing requirements), it is necessary to provide efficient connectivity that enables the two registers to drive one another. Such efficient connectivity can be accomplished by coupling register outputs, as additional inputs to the multiplexing circuitry of the CLE, as shown in FIG. 5. An additional inverter on clock can be implemented to enable two registers to receive clocks that are phased apart by 180 degrees, and therefore provide a negative level triggered latch.

Figure 7:
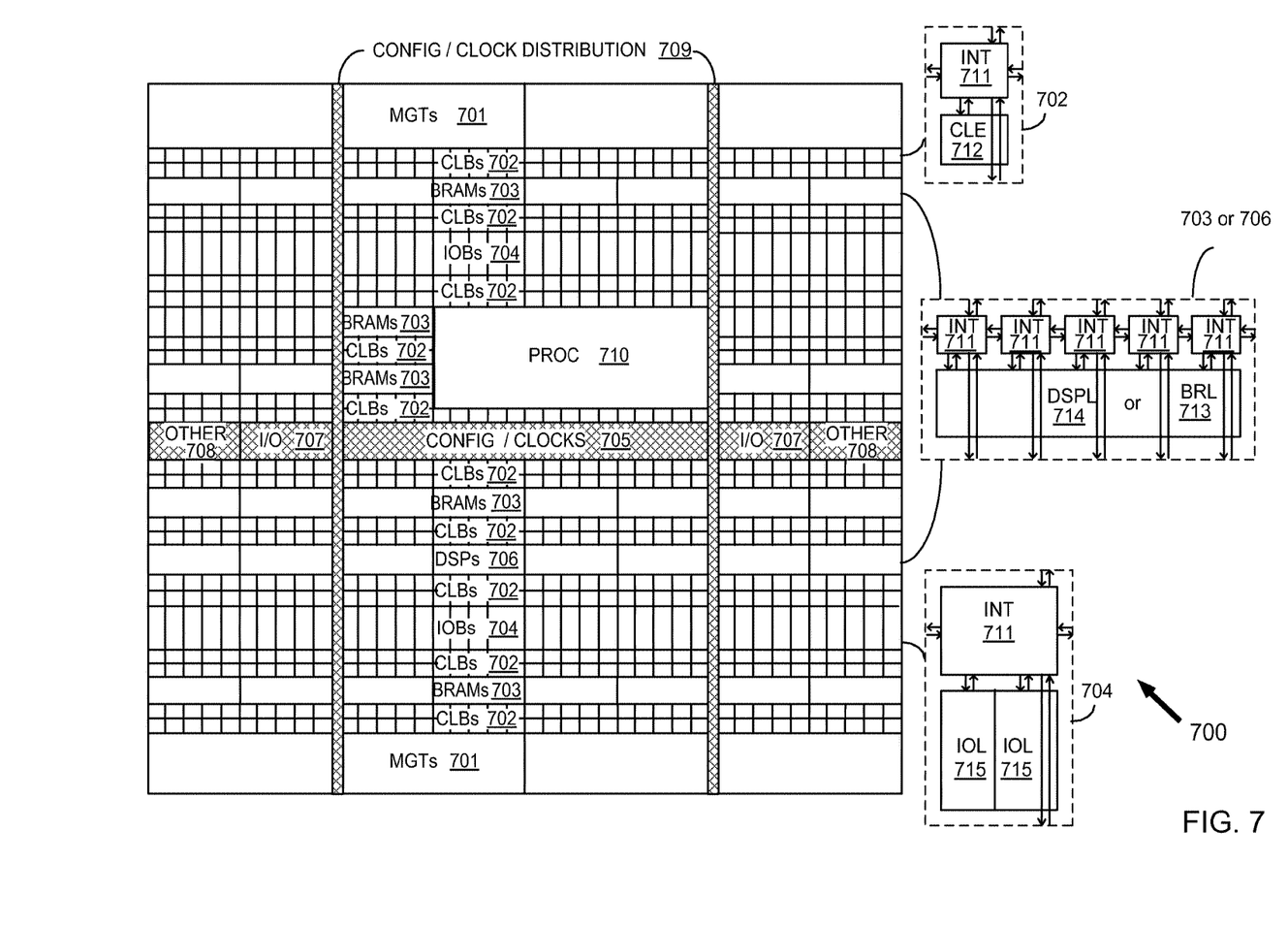
FIG. 7 is a block diagram of a device having programmable resources that may implement any of the circuits of FIGS. 1-6.

Turning now to FIG. 7, a block diagram of a device having programmable resources that may implement the circuits of FIGS. 1-6 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell. As set forth above, the configuration bits can be used to configure a register of a CLE as a latch and route an inverted clock signal to that latch.

The device of FIG. 7 comprises an FPGA architecture 700 having a large number of different programmable tiles including multi-gigabit transceivers (MGTs) 701, CLBs 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707 (e.g., configuration ports and clock ports), and other programmable logic 708 such as digital clock managers, analog-to-digital converters, system monitoring logic, and so forth. Some FPGAs also include dedicated processor blocks (PROC) 710, which may be used to implement a software application, for example.

In some FPGAs, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA. The programmable interconnect element 711 also includes the connections to and from the programmable logic element within the same tile, as shown by the examples included at the top of FIG. 7.

For example, a CLB 702 may include a configurable logic element (CLE) 712 that may be programmed to implement user logic plus a single programmable interconnect element 711. A BRAM 703 may include a BRAM logic element (BRL) 713 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 706 may include a DSP logic element (DSPL) 714 in addition to an appropriate number of programmable interconnect elements. An IOB 704 may include, for example, two instances of an input/output logic element (IOL) 715 in addition to one instance of the programmable interconnect element 711. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. The config/clock distribution regions 709 extending from this column are used to distribute the clocks and configuration signals across the breadth of the FPGA. Some FPGAs utilizing the architecture illustrated in FIG. 7 include additional logic blocks that disrupt the regular columnar structure making up a large part of the FPGA. The additional logic blocks may be programmable blocks and/or dedicated logic. For example, the processor block PROC 710 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear in order to facilitate the efficient implementation of user logic. While the embodiment of FIG. 7 relates to an integrated circuit having programmable resources, it should be understood that the circuits and methods set forth in more detail below could be implemented in any type of ASIC.

Figure 8:
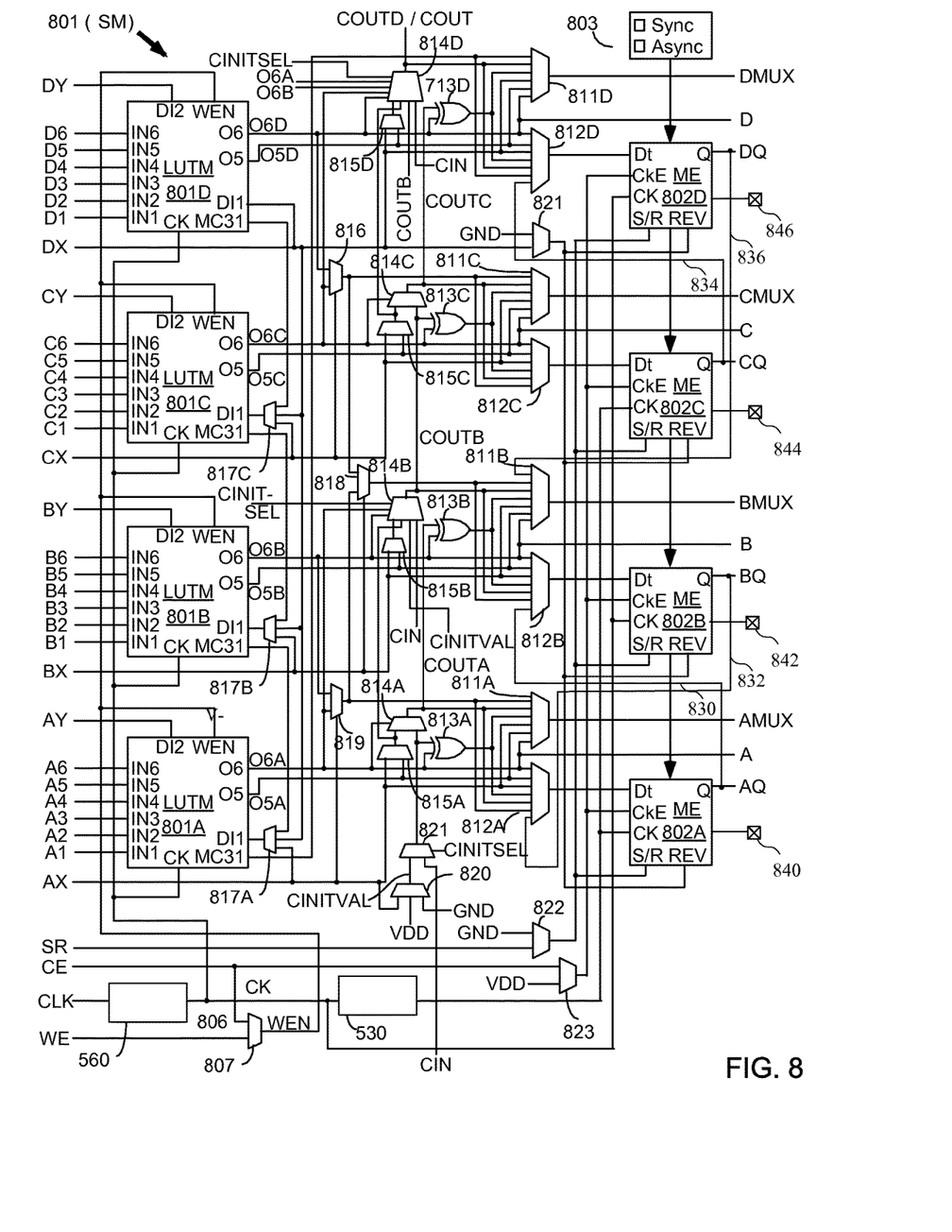
FIG. 8 is a block diagram of a configurable logic element of the device of FIG. 7.

Turning now to FIG. 8, a block diagram of a configurable logic element of the device of FIG. 7 is shown. In particular, FIG. 8 illustrates in simplified form a configurable logic element of a configuration logic block 702 of FIG. 7. In the embodiment of FIG. 8, slice M 801 includes four lookup tables (LUTMs) 801A-801D, each driven by six LUT data input terminals A1-A6, B1-B6, C1-C6, and D1-D6 and each providing two LUT output signals O5 and O6. The O6 output terminals from LUTs 801A-801D drive slice output terminals A-D, respectively. The LUT data input signals are supplied by the FPGA interconnect structure via input multiplexers, which may be implemented by programmable interconnect element 811, and the LUT output signals are also supplied to the interconnect structure. Slice M also includes: output select multiplexers 811A-811D driving output terminals AMUX-DMUX; multiplexers 812A-812D driving the data input terminals of memory elements 802A-802D; combinational multiplexers 816, 818, and 819; bounce multiplexer circuits 822-823; the circuits 530 and 560 (that together provide an optional inversion on the input clock path as described in reference to FIG. 5 where first and second registers of a pair of registers receive clock signals that are 180 degrees out of phase); and carry logic having multiplexers 814A-814D, 815A-815D, 820-821 and exclusive OR gates 813A-813D. All of these elements are coupled together as shown in FIG. 8. Where select inputs are not shown for the multiplexers illustrated in FIG. 8, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 8 for clarity, as well as from other selected figures herein.

In the pictured embodiment, each memory element 802A-802D may be programmed to function as a synchronous or asynchronous flip-flop or latch. The selection between synchronous and asynchronous functionality is made for all four memory elements in a slice by programming Sync/Asynch selection circuit 803. When a memory element is programmed so that the S/R (set/reset) input signal provides a set function, the REV input terminal provides the reset function. When the memory element is programmed so that the S/R input signal provides a reset function, the REV input terminal provides the set function. Memory elements 802A-802D are clocked by a clock signal CK, which may be provided by a global clock network or by the interconnect structure, for example. Such programmable memory elements are well known in the art of FPGA design. Each memory element 802A-802D provides a registered output signal AQ-DQ to the interconnect structure. Because each LUT 801A-801D provides two output signals, O5 and O6, the LUT may be configured to function as two 5-input LUTs with five shared input signals (IN1-IN5), or as one 6-input LUT having input signals IN1-IN6.

In the embodiment of FIG. 8, each LUTM 801A-801D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 817A-817C for LUTs 801A-801C), or to the two 32-bit RAMs via input terminals DI1 and DI2. RAM write operations in the LUT RAMs are controlled by clock signal CK from multiplexer 806 and by write enable signal WEN from multiplexer 807, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 801A may also be provided to the general interconnect structure for shift register chaining, via output select multiplexer 811D and CLE output terminal DMUX.

In addition to providing the clock control circuits 530 and 560 that enable the selection of appropriate clock signals to implement a lockup latch as described in reference to FIG. 5, outputs of the memory elements 802A-802D, which may be registers for example, are fed back to multiplexers to enable routing of the outputs of one memory element to the input of another memory element. More particularly, an output of memory element 802A is routed to an input of the multiplexer 812B by way of a signal line 830, shown here as a dedicated signal line of the slice M 801. Similarly, an output of memory element 802B is routed to an input of the multiplexer 812A by way of a signal line 832. An output of memory element 802C of a second pair or memory elements of the slice M 801 is routed to an input of the multiplexer 812D by way of a signal line 834. Finally, an output of memory element 802D is routed to an input of the multiplexer 812C by way of a signal line 836. The memory elements 802A-802D are also programmable to be implemented as a register or a latch. As shown in FIG. 8, each of the memory elements 802A-802D is coupled to a programmable memory element 840-846, respectively, which may be programmable by a configuration bit as set forth above. Accordingly, the circuits and methods set forth above may be implemented in a device such as the devices of FIGS. 7 and 8, or any other suitable device.

Figure 9:
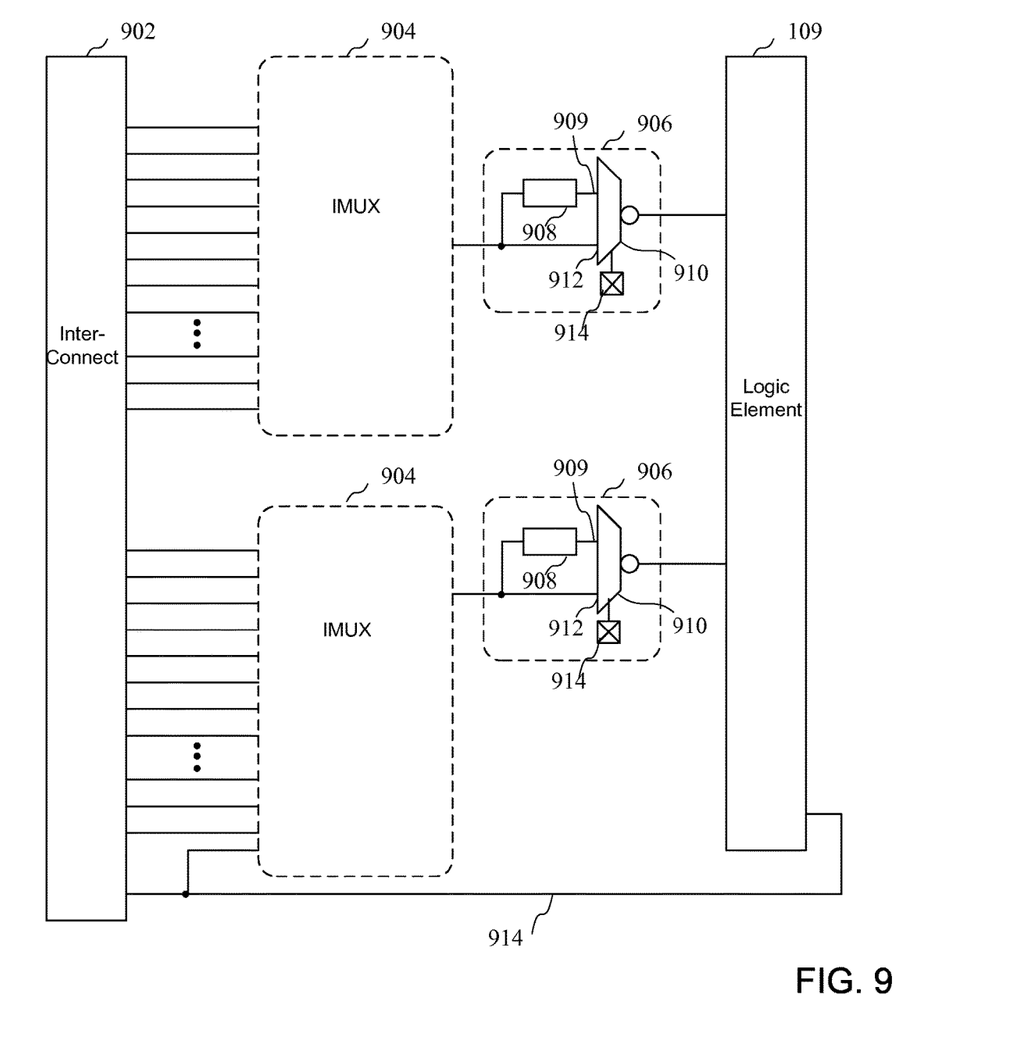
FIG. 9 is a block diagram of interconnect circuits having controllable delays that may be coupled to inputs of a configurable logic element of the device of FIG. 8.

Turning now to FIG. 9, a block diagram of interconnect circuits having controllable delays coupled to inputs of a configurable logic element of the device of FIG. 8 is shown. As shown in FIG. 9, an interconnect element 902 is coupled to one or more interconnect multiplexers 904, the output of which is coupled to a delay circuit 906 having a user-selectable delay element. In particular, the delay circuit 906 comprises a delay element 908 coupled to a first input 909 of a multiplexer 910. A non-delayed output of the multiplexer 904 is coupled to a second input 912 of the multiplexer 910, which is controlled by a memory element 914. These optional delay elements may be implemented to compensate large range of delays. While a single delay element is shown, it should be understood that multiple delay elements or a programmable delay element having a number of taps could be used. Using the optional buffers for compensating small skews, while the delay elements enables compensating for large skews of about one-half a clock cycle. While the optional delay provides the advantage of allowing the range of skews to be compensated from very low to high values by enabling the required tap in the delay line, the cost of enabling this range of skew compensation may be high in terms of large number of taps per optional delay buffer.

Figure 10:
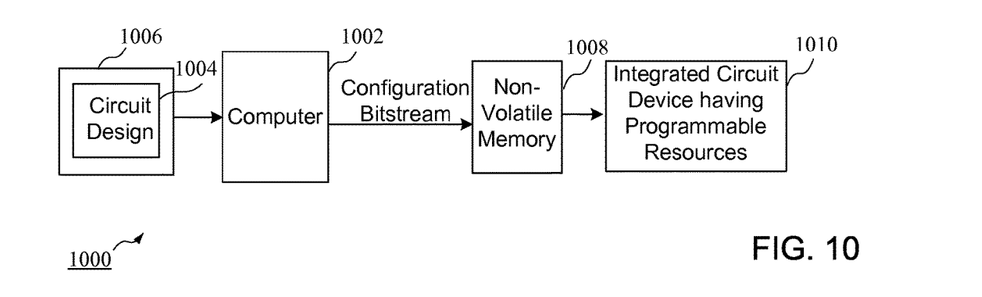
FIG. 10 is a block diagram of a system for programming a device having programmable resources.

Turning now to FIG. 10, a block diagram of a system for programming a device having programmable resources is shown. In particular, a computer 1002 is coupled to receive a circuit design 1004 from a memory 1006, and generate a configuration bitstream that is stored in the non-volatile memory 1006. As will be described in more detail below, the circuit design may be a high level design, such as a circuit design defined in a hardware description language (HDL). Also, the computer may be configured to run software that generates a configuration bitstream that is stored in the non-volatile memory 1008 and provided to an integrated circuit 1010 that may be a programmable integrated circuit, such as the integrated circuit described above in FIGS. 7-9.

Figure 11:
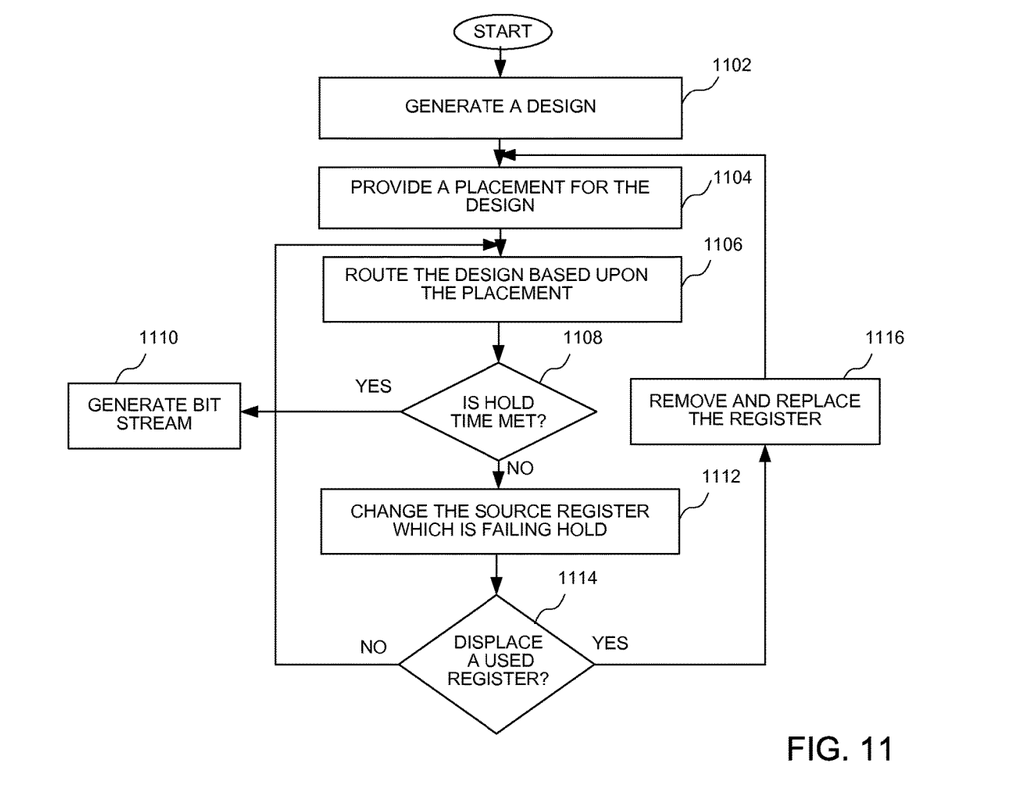
FIG. 11 is a flow chart showing a method of processing data in an integrated circuit device.

Turning now to FIG. 11, a flow chart shows a method of processing data in an integrated circuit device. A design is generated at a block 1102. A placement for the design is then provided at a block 1104. The design is routed based upon the placement at a block 1106. It is then determined whether a hold time is met at a block 1108. If so, a bitstream is generated at a block 1110. If not, the source register for which the hold time is not met is changed at a block 1112. It is then determined whether it is necessary to displace a user register at a block 1114. If not, the design is routed again at the block 1106. If so, the register is removed and replaced at a block 1116 and the design is placed again at the block 1104.

Figure 12:
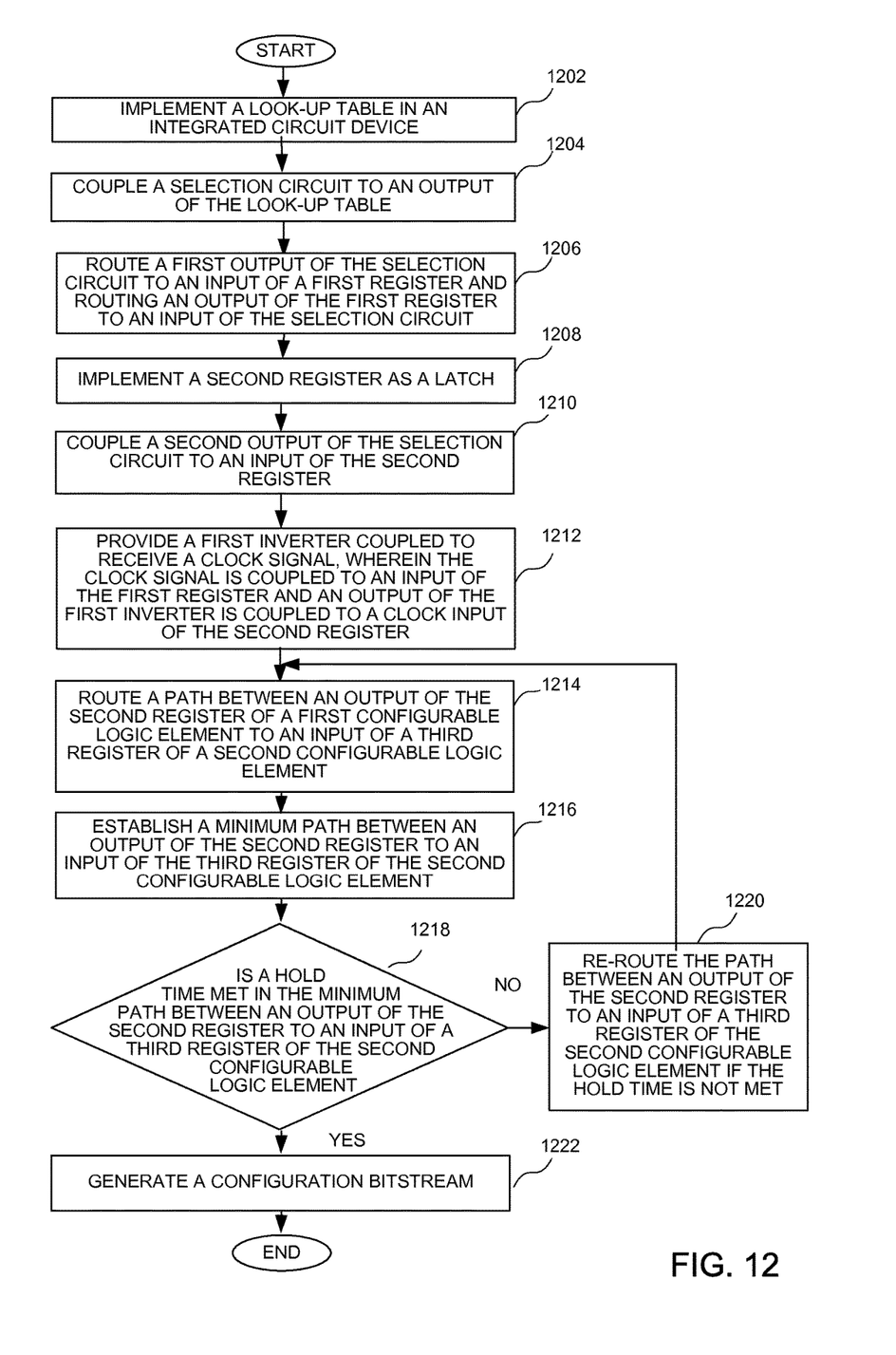
FIG. 12 is another flow chart showing a method of processing data in an integrated circuit device.

Turning now to FIG. 12, another flow chart shows a method of processing data in an integrated circuit device. A look-up table is implemented in the integrated circuit device at a block 1202. A selection circuit is coupled to an output of the look-up table at a block 1204. A first output of the selection circuit is routed to an input of a first register and an output of the first register is coupled to an input of the selection circuit at a block 1206. A second register is implemented as a latch at a block 1208. A second output of the selection circuit is coupled to an input of the second register at a block 1210. A first inverter coupled to receive a clock signal is provided at a block 1212, wherein the clock signal is coupled to an input of the first register and an output of the first inverter is coupled to a clock input of the second register. A path is routed between an output of the second register of a first configurable logic element and an input of a third register of a second configurable logic element at a block 1214. A minimum path is established between an output of the second register to an input of a third register of the second configurable logic element at a block 1216. It is then determined whether a hold time met in the minimum path between an output of the second register to an input of a third register of the second configurable logic element at a block 1218. If not, the path between an output of the second register to an input of a third register of the second configurable logic element is re-routed if the hold time is not met at a block 1220. If so, a configuration bitstream is generated at a block 1222.

It can therefore be appreciated that a circuit for and methods of processing data in an integrated circuit device have been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A circuit for processing data in an integrated circuit device, the circuit comprising:
    a lookup table;
    a selection circuit coupled to the lookup table;
    a first register coupled to a first output of the selection circuit;
    a second register implemented as a latch and coupled to a second output of the selection circuit;
    a signal line coupled between the output of the first register and an input of the selection circuit;
    a configuration memory having configuration bits for configuring the selection circuit to enable the coupling of the output of the first register to an input of the second register; and
    a first clock control circuit having a clock selection multiplexer coupled to receive the clock signal at a first input and further coupled to receive an inverted clock signal generated at the output of the first inverter at a second input;
    wherein the clock signal is coupled to a clock input of the first register and an output of the clock selection multiplexer is coupled to a clock input of the second register;
    wherein the selection circuit enables the coupling of an output signal of the first register to the input of the second register.

2. The circuit of claim 1, wherein the signal line comprises a dedicated signal line.

3. The circuit of claim 1, further comprising a first inverter having an input coupled to receive a clock signal, wherein an output of the first inverter is coupled to a clock input of the second register.

4. The circuit of claim 1, further comprising:
    a second clock control circuit having a second inverter including an output coupled to the input of the first inverter; and
    wherein the second clock control circuit enables the coupling of an input clock signal or an inverted input clock signal to the input of the first inverter as the clock signal.

5. The circuit of claim 1, wherein the configuration memory has configuration bits for configuring the second register as a latch.

6. A circuit for processing data in an integrated circuit device, the circuit comprising:
    a configuration memory having configuration bits;
    a plurality of configurable logic elements, each configurable logic element comprising:
        a look-up table;
        a selection circuit coupled to an output of the look-up table;
        a first register coupled to a first output of the selection circuit;
        a second register implemented as a latch and coupled to a second output of the selection circuit; and
        a first clock control circuit having a clock selection multiplexer coupled to receive a clock signal at a first input and further coupled to receive an inverted clock signal generated at the output of the first inverter at a second input, wherein the clock signal is coupled to a clock input of the first register and an output of the clock selection multiplexer is coupled to a clock input of the second register;
    wherein the configuration bits of the configuration memory enable a configuration of the selection circuit to couple an output of the first register to an input of the second register; and
    programmable interconnect elements that are configurable to couple an output of a first configurable logic element of the plurality of configurable logic elements to an input of a second configurable logic element of the plurality of configurable logic elements.

7. The circuit of claim 6, wherein each configurable logic element of the plurality of configurable logic elements further comprises:
    a second clock control circuit having a second inverter including an output coupled to an input of the first inverter;
    wherein the second clock control circuit enables the coupling of an input clock signal or an inverted input clock signal to the input of the first inverter as the clock signal.

8. The circuit of claim 6, wherein the configuration memory has configuration bits for configuring the second register of the configurable logic element as a latch.

9. The circuit of claim 6, wherein each configurable logic element comprises a signal line coupled between the output of the first register and an input of the selection circuit.

10. A method of processing data in an integrated circuit device, the method comprising:
    providing a selection circuit having a plurality of inputs configured to receive inputs from a lookup table and having at least one output;
    providing a configuration memory having configuration bits for configuring the selection circuit;
    routing an output of a first register to an input of the selection circuit;
    implementing a second register as a latch; and
    coupling the at least one output of the selection circuit to an input of the second register to enable the coupling of the output of the first register to the input of the second register; and
    providing a first inverter coupled to receive a clock signal;
    wherein the clock signal is coupled to a clock input of the first register and an output of the first inverter is coupled to a clock input of the second register.

11. The method of claim 10, wherein:
    the first and second registers are a part of a first configurable logic element; and
    the method further comprises providing a path between an output of the second register to an input of a third register of a second configurable logic element.

12. The method of claim 11, wherein routing an output of a first register to an input of a selection circuit comprises providing a dedicated path.

13. The method of claim 11, further comprising determining if a hold time is met in the path between the output of the second register and the input of the third register of the second configurable logic element.

14. The method of claim 13, further comprising re-routing the path between the output of the second register and the input of the third register of the second configurable logic element if the hold time is not met.

\* \* \* \* \*